US012462070B2

(12) United States Patent
Che et al.

(10) Patent No.: US 12,462,070 B2
(45) Date of Patent: Nov. 4, 2025

(54) SOFTWARE ASSISTED ACCELERATION IN CRYPTOGRAPHIC QUEUE PROCESSING

(71) Applicant: ATI Technologies ULC, Markham (CA)

(72) Inventors: Shijie Che, Markham (CA); Wentao Xu, Markham (CA)

(73) Assignee: ATI Technologies ULC, Markham (CA)

(*) Notice: Subject to any disclaimer, the term of this patent is extended or adjusted under 35 U.S.C. 154(b) by 257 days.

(21) Appl. No.: 17/563,900

(22) Filed: Dec. 28, 2021

(65) Prior Publication Data

US 2023/0205935 A1 Jun. 29, 2023

(51) Int. Cl.
*G06F 21/72* (2013.01)
*G06F 12/128* (2016.01)
*G06F 12/14* (2006.01)
*G06F 16/00* (2019.01)
*G06F 21/60* (2013.01)
*H04L 15/16* (2006.01)
*H04L 29/06* (2006.01)
*H04L 29/08* (2006.01)

(52) U.S. Cl.
CPC .................................. *G06F 21/72* (2013.01)

(58) Field of Classification Search
CPC ............................ G06F 21/72; G06F 21/602
USPC ........................................................ 713/189
See application file for complete search history.

(56) References Cited

U.S. PATENT DOCUMENTS

| 7,328,339 | B1  | 2/2008  | Janarthanam et al. |
|-----------|-----|---------|--------------------|
| 7,392,399 | B2* | 6/2008  | Grohoski ............... H04L 63/164 |
|           |     |         | 712/E9.067 |
| 7,783,895 | B2* | 8/2010  | Hori ......................... G06F 21/80 |
|           |     |         | 380/287 |
| 8,141,068 | B1* | 3/2012  | Thompson .............. G06F 8/445 |
|           |     |         | 717/161 |
| 8,321,659 | B2  | 11/2012 | Haneda |
| 8,458,377 | B2  | 6/2013  | Piccirillo et al. |

(Continued)

FOREIGN PATENT DOCUMENTS

| CA | 2944482 C    * | 1/2024 | ......... G06Q 20/3829 |
| CN | 111782344 B  * | 6/2024 | ........... G06F 21/602 |

(Continued)

*Primary Examiner* — Emmanuel L Moise
*Assistant Examiner* — Berhanu Shitayewoldetadik
(74) *Attorney, Agent, or Firm* — Kowert, Hood, Munyon, Rankin & Goetzel, P.C.; Rory D. Rankin

(57) ABSTRACT

A system and method for efficiently processing security service requests are described. In various implementations, an integrated circuit includes at least one or more processors with a dedicated security processor and on-chip memory that has a higher security level than off-chip memory. During the processing of security service requests, the security processor receives multiple commands with each including a cryptographic function. The security processor identifies one or more issue groups of commands based at least upon data dependencies and shared source data. When the security processor determines an issued command is in a given issue group, the security processor issues a next command from remaining commands in the given issue group. Otherwise, the security processor issues an immediately next in-order command after the issued command.

17 Claims, 6 Drawing Sheets

(56) References Cited

U.S. PATENT DOCUMENTS

| | | | |
|---|---|---|---|
| 8,737,604 B2 | 5/2014 | Li et al. | |
| 8,959,576 B2 * | 2/2015 | Sastry | G06F 21/78 |
| | | | 726/4 |
| 9,021,596 B2 * | 4/2015 | Beskrovny | G06F 21/577 |
| | | | 713/189 |
| 9,032,530 B2 * | 5/2015 | Beskrovny | G06F 21/577 |
| | | | 705/51 |
| 9,292,569 B2 * | 3/2016 | Aingaran | G06F 9/381 |
| 9,524,249 B2 | 12/2016 | Chhabra et al. | |
| 9,614,666 B2 | 4/2017 | Kishinevsky et al. | |
| 9,659,170 B2 * | 5/2017 | Chapman, III | G06F 9/45558 |
| 11,055,812 B1 * | 7/2021 | Asthana | G06F 9/5027 |
| 11,750,379 B2 * | 9/2023 | Bedau | G06F 21/602 |
| | | | 380/279 |
| 2004/0249993 A1 * | 12/2004 | Hori | G06F 21/80 |
| | | | 710/20 |
| 2004/0250092 A1 * | 12/2004 | Hori | G06F 21/10 |
| | | | 713/189 |
| 2005/0071651 A1 * | 3/2005 | Aguilar, Jr. | G06F 21/602 |
| | | | 713/189 |
| 2005/0223201 A1 * | 10/2005 | Tremblay | G06F 9/3863 |
| | | | 712/E9.05 |
| 2008/0098233 A1 * | 4/2008 | Dewkett | G06F 21/72 |
| | | | 713/189 |
| 2008/0126641 A1 * | 5/2008 | Irish | G06F 13/1631 |
| | | | 710/112 |
| 2012/0011351 A1 * | 1/2012 | Mundra | H04L 9/3242 |
| | | | 713/192 |
| 2012/0116602 A1 * | 5/2012 | Vaswani | H04L 9/0897 |
| | | | 700/295 |
| 2014/0096255 A1 * | 4/2014 | Beskrovny | G06F 21/577 |
| | | | 726/25 |
| 2016/0269364 A1 * | 9/2016 | White | H04L 63/20 |
| 2017/0250966 A1 * | 8/2017 | White | G06F 21/604 |
| 2018/0247654 A1 * | 8/2018 | Bhaya | G06F 40/205 |
| 2019/0012266 A1 * | 1/2019 | Brandt | G06F 12/1009 |
| 2019/0156043 A1 * | 5/2019 | Chhabra | H04L 9/0877 |
| 2021/0096921 A1 * | 4/2021 | Banerjee | G06F 9/4881 |
| 2023/0169025 A1 * | 6/2023 | Deng | G06F 13/28 |
| | | | 710/22 |
| 2023/0281292 A1 * | 9/2023 | Wu | H04L 9/0866 |
| | | | 713/189 |
| 2023/0299968 A1 * | 9/2023 | Dyrba | H04L 9/088 |
| | | | 713/189 |
| 2024/0411909 A1 * | 12/2024 | Yuan | G06F 21/602 |

FOREIGN PATENT DOCUMENTS

| | | | | |
|---|---|---|---|---|
| KR | 100406137 B1 * | 11/2003 | | H04L 63/0485 |
| WO | WO-2024015537 A1 * | 1/2024 | | H04L 9/3247 |

* cited by examiner

SOFTWARE ASSISTED ACCELERATION IN CRYPTOGRAPHIC QUEUE PROCESSING

BACKGROUND

Description of the Relevant Art

Enterprise and small business environments, university environments, medical environments, and so on use a variety of computing devices for data processing. Examples of the data processing are generating, storing, accessing, distributing, and protecting multiple types of data. Examples of the computing devices are servers that deliver critical applications and services, desktop computers, laptops, smartphones, and so forth. One of the critical applications used in these environments is a security application that accesses one of one or more cryptographic service providers (CSPs). In some cases, the security application calls an application programming interface (API) to both select and use a particular cryptographic service provider.

A system administrator or other user utilizes a cryptographic service provider for providing multiple security services. Examples of these services are encrypting data, generating data signatures and other hash values, generating unique identifiers (IDs), generating pseudorandom numbers, providing encrypted data storage of private keys, and so on. In many cases, a user operating a client computing device generates security service requests that are transmitted over a network to a remote server that has the cryptographic service provider. In other cases, an application running on a local desktop computer generates security service requests that are transmitted to a cryptographic service provider running on the local desktop computer.

When a security software application sends service requests to the cryptographic service provider, the security software application sends multiple, various cryptographic commands. Some of these cryptographic commands (or commands) target a same source data payload. However, a dedicated security processor, or other processing unit, that executes the cryptographic service provider processes the commands in both a serialized manner and an independent manner. Processing the multiple commands in this serialized, independent manner causes the latency of processing the multiple commands to increase. For example, the cryptographic service provider repeatedly fetches the same data payload from off-chip memory to on-chip memory of the dedicated security processor. Additionally, the security processor does not take advantage of any data dependencies between commands where the intermediate generated data can be immediately consumed.

In view of the above, improved systems and methods for efficiently processing security service requests are desired.

Figure 1:
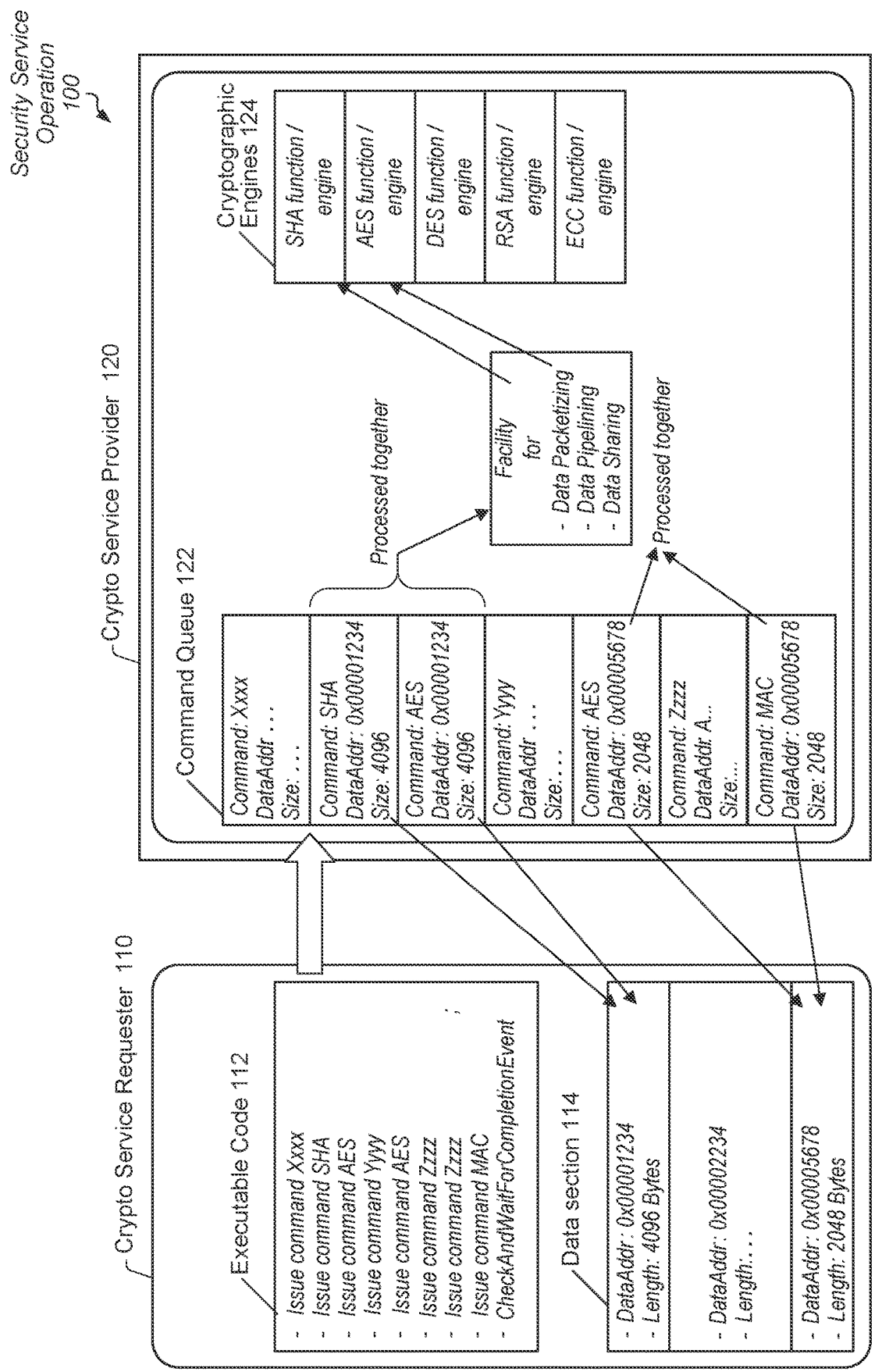
FIG. 1 is a generalized diagram of one implementation of a security service operation.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for efficiently processing security service requests are contemplated. In various implementations, a computing system includes at least one or more processors and on-chip memory. The on-chip memory has a higher security level than off-chip memory. One of the one or more processors is designated as a security processor for the computing system. In some implementations, the security processor is a coprocessor within a central processing unit (CPU), a graphics processing unit (GPU), one of a variety of types of an application specific integrated circuit (ASIC), a digital signal processor (DSP), a multimedia engine, or other. One of the many activities that the security processor performs for the computing system is executing security service requests.

During the processing of security service requests, the security processor receives multiple commands with each including a cryptographic function. The security processor stores the received commands in a command queue. The security processor executes a lightweight operating system that identifies available cryptographic hardware resources of the computing system. The security processor executes a scheduler of the lightweight operating system that identifies an issue group of commands based on both the available cryptographic hardware resources, data dependencies of the commands, and shared targeted source data of the commands. As used herein, an "issue group" refers to a group of commands that can be issued and processed together. By identifying issue groups of commands and issuing the commands within a particular issue group in an atomic manner (no commands outside the issue group are issued until each command in the issue group is issued), the security processor reduces the latency of processing of security service requests.

Turning now to FIG. 1, a generalized block diagram is shown of a security service operation 100. As shown, a cryptographic service requester 110 sends security service requests to a cryptographic service provider 120. In various implementations, each of the cryptographic service requester 110 and the cryptographic service provider 120 is a combination of firmware, other software, and dedicated hardware, such as circuitry, used to process applications and provide services. In some implementations, the cryptographic service requester 110 and the cryptographic service provider 120 are located on a same server or desktop computer. In other implementations, they are located on separate computing devices across a network. The cryptographic service provider 120 processes the received security service requests, and sends the result data to the cryptographic service requester 110.

A system administrator or other user utilizes a cryptographic service provider 120 for providing multiple security services. Examples of these services are encrypting data, generating data signatures and other hash values, generating unique identifiers (IDs), generating pseudorandom numbers, providing encrypted data storage of private keys, and so on. The cryptographic service requester 110 sends security service requests that include the executable code 112 and the accompanying data section 114. The executable code 112 (or code 112) includes multiple commands with each command including a cryptographic function. For example, the commands include at least secure hash algorithm (SHA) commands, advanced encryption standard (AES) commands, message authentication code (MAC) commands, and so on. The data section 114 includes the corresponding source data corresponding to the commands. In some implementations, a copy of the data section 114 is stored in one or more levels of caches of a destination computing device before being loaded into on-chip memory such as secure on-chip memory. In some implementations, the destination computing device performs authentication of each of the received commands and source data before proceeding with the secure service request.

The destination computing device that runs the cryptographic service provider 120 includes available hardware resources such as the cryptographic engines 124. Examples of the available cryptographic hardware resources in the cryptographic engines 124 are an on-die SHA Engine with dedicated circuitry that executes a secure hash algorithm (SHA), an on-die AES Engine with dedicated circuitry that executes an advanced encryption standard (AES) algorithm, an on-die MAC Engine with dedicated circuitry that executes a message authentication code (MAC) algorithm, an on-die DES Engine with dedicated circuitry that executes an data encryption standard (DES) algorithm, an on-die ECC Engine with dedicated circuitry that executes an Elliptic-Curve Cryptography (ECC) algorithm, an on-die RSA Engine with dedicated circuitry that executes an asymmetric public key cryptography algorithm named after Rivest, Shamir and Adleman (RSA), and so on.

The dedicated hardware of the cryptographic engines 124 includes standalone processing units or engines as well as portions of other processing units. For example, one or more compute units, each with multiple parallel lanes of execution, of a GPU can be designated for use as one of the cryptographic engines 124. The received commands are stored in the command queue 122. Rather than process the commands in an in-order, serialized, and independent manner, a processor (not shown) executes a scheduler that searches the received commands to identify issue groups of commands. For example, the scheduler identifies an issue group of commands based on the available cryptographic hardware resources, data dependencies of the commands, and shared targeted source data of the commands. For example, the scheduler determines at least two commands target a same source data payload (or same source data). When the two commands satisfy other conditions for forming an issue group, the source data is fetched only once from off-chip memory, and used for processing of the at least two commands by dedicated engines of the cryptographic engines 124.

In another example, a first command generates output data that is used as input data for a second command. The second command is either a command immediately adjacent to the first command or a command with one or more intermediate commands between itself and the first command. It is possible that this output data is consumed immediately by the second command, rather than the output data being first encrypted, stored in off-chip memory, loaded at a later time from off-chip memory, authenticated, and then consumed by the second command. Commands with such a producer/consumer relationship may be referred to as "chained" commands. It is possible that the chained group has more than two commands. As used herein, a "chained" issue group is a group of commands in which all commands in the group have a producer/consumer relationship with another command in the group. For example, a first command generates output data that is consumed by a second command. Similarly, the second command may generate output data that is consumed by a third command, and so on. By identifying such groups of commands and processing the commands as described, the cryptographic service provider 120 reduces both latency and data storage required for performing the received security service requests.

Figure 2:
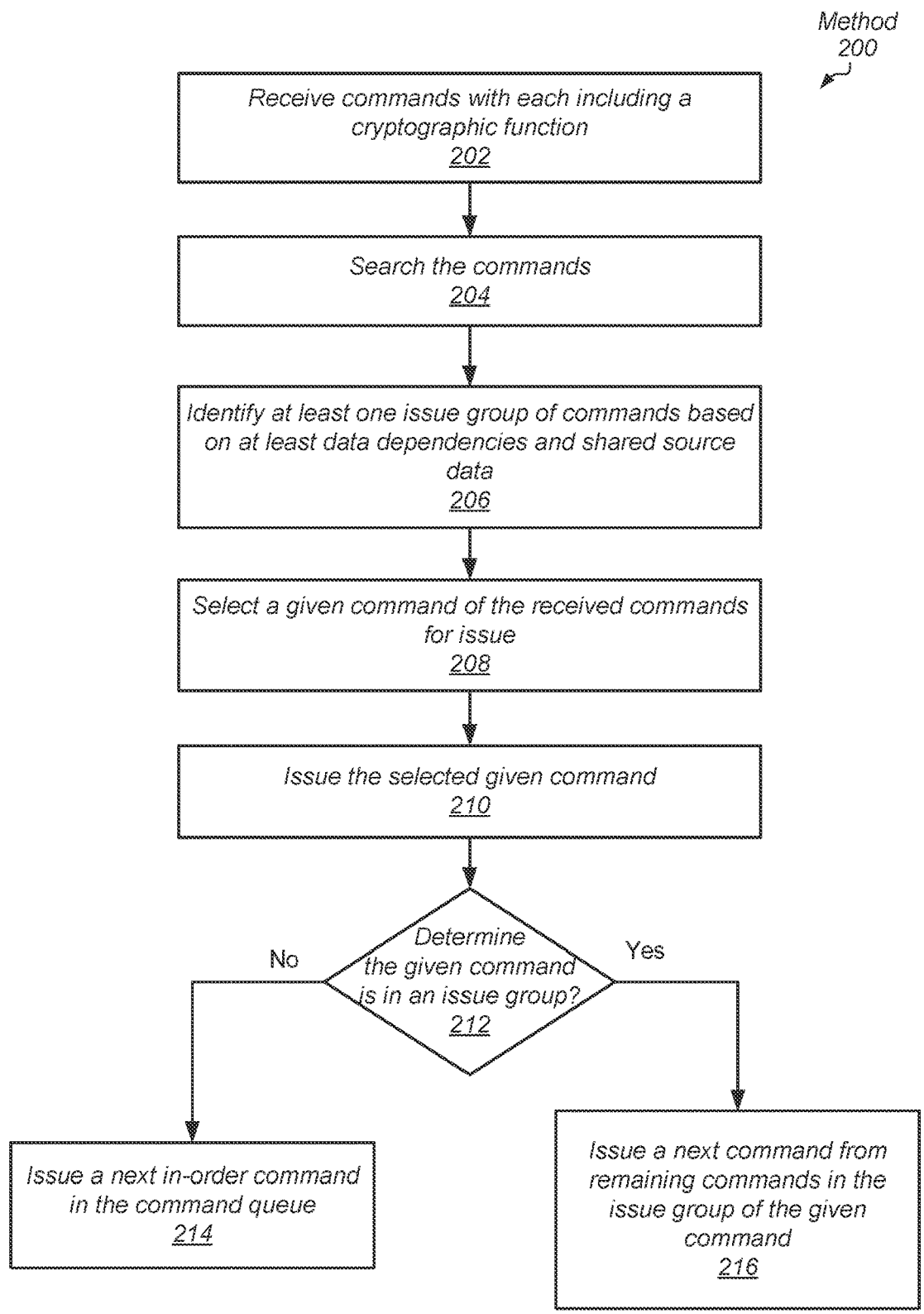
FIG. 2 is a generalized diagram of one implementation of a method for efficiently processing security service requests.

Referring now to FIG. 2, a generalized block diagram is shown of a method 200 for efficiently processing security service requests. For purposes of discussion, the steps in this implementation (as well as for FIGS. 4-6) are shown in sequential order. However, in other implementations some steps occur in a different order than shown, some steps are performed concurrently, some steps are combined with other steps, and some steps are absent.

In various implementations, a computing system includes at least one or more processors and on-chip memory. The on-chip memory has a higher security level than off-chip memory. One of the one or more processors is designated as a security processor for the computing system. Alternatively, a coprocessor or other component within one of the processors is used as the dedicated security processor. For example, in some implementations, the security processor is a coprocessor within a central processing unit (CPU), a graphics processing unit (GPU), one of a variety of types of an application specific integrated circuit (ASIC), a digital signal processor (DSP), a multimedia engine, or other. One of the many activities that the security processor performs for the computing system is executing security service requests. The security processor (or processor) receives commands with each command including a cryptographic function (block 202).

The processor searches the received commands to identify one or more issue groups of commands that can be issued together (block 204). The number of commands issued at one time, such as in a same clock cycle, can vary based on the design. However, once a command of a given issue group is selected for issue and issued, the processor issues the other commands in the given issue group before issuing any commands in the command queue that are not in the given issue group. In various implementations, the processor determines commands belong in the given issue group based on available hardware resources, detected data dependencies, and detected shared source data.

In one example, at least two commands target a same source data payload. This source data payload is fetched only once from off-chip memory, and used for processing of the at least two commands by cryptographic engines. In this case, the issue group of the at least two commands can also be referred to as an "unchained" issue group. It is possible that the unchained issue group has more than two commands. For example, each of a first command, a second command, and a third command target the same source data payload. This third command can be a command immediately adjacent to the second command in the command queue or a command with one or more intermediate commands between itself and the second command in the command queue. Similarly, the second command can be a command immediately adjacent to the first command in the command queue or a command with one or more intermediate commands between itself and the first command in the command queue.

In another example, a first command generates output data that is used as input data for a second command. This output data is consumed immediately by the second command, rather than having the output data be encrypted, stored in off-chip memory, loaded at a later time from off-chip memory, authenticated, and then consumed by the second command. In this case, the issue group of the at least two commands can also be referred to as a "chained" issue group. It is possible that the chained group has more than two commands. For example, the first command generates output data that is immediately consumed by the second command as already described. Similarly, the second command generates output data that is immediately consumed by a third command, and so on. This third command can be a command immediately adjacent to the second command in the command queue or a command with one or more intermediate commands between itself and the second command in the command queue. Similarly, the second command can be a command immediately adjacent to the first command in the command queue or a command with one or more intermediate commands between itself and the first command in the command queue.

The processor identifies at least one issue group of commands based on at least one of data dependencies and shared targeted source data of the commands (block 206). In various implementations, the processor also identifies issue groups based on identified available cryptographic hardware resources of the computing system. For example, the processor is capable of identifying available cryptographic hardware resources of the computing system such as an on-die SHA Engine with dedicated circuitry that executes a secure hash algorithm (SHA) and so on. The processor selects a given command of the received commands (block 208). In some implementations, the processor selects a head-of-the-queue command in the command queue. In one example, when the processor is not currently issuing commands from an issue group, the head-of-the-queue command is the oldest command in the command queue. In another example, when the processor is currently issuing commands from a particular issue group, the head-of-the-queue command is an oldest command in the particular issue group.

The processor issues the selected given command (block 210). If the processor does not determine the given command is in an issue group ("no" branch of the conditional block 212), then the processor issues a next in-order command in the command queue (block 214). However, if the processor determines the given command is in an issue group ("yes" branch of the conditional block 212), then the processor issues a next command from remaining commands in the issue group of the given command (block 216).

Figure 3:
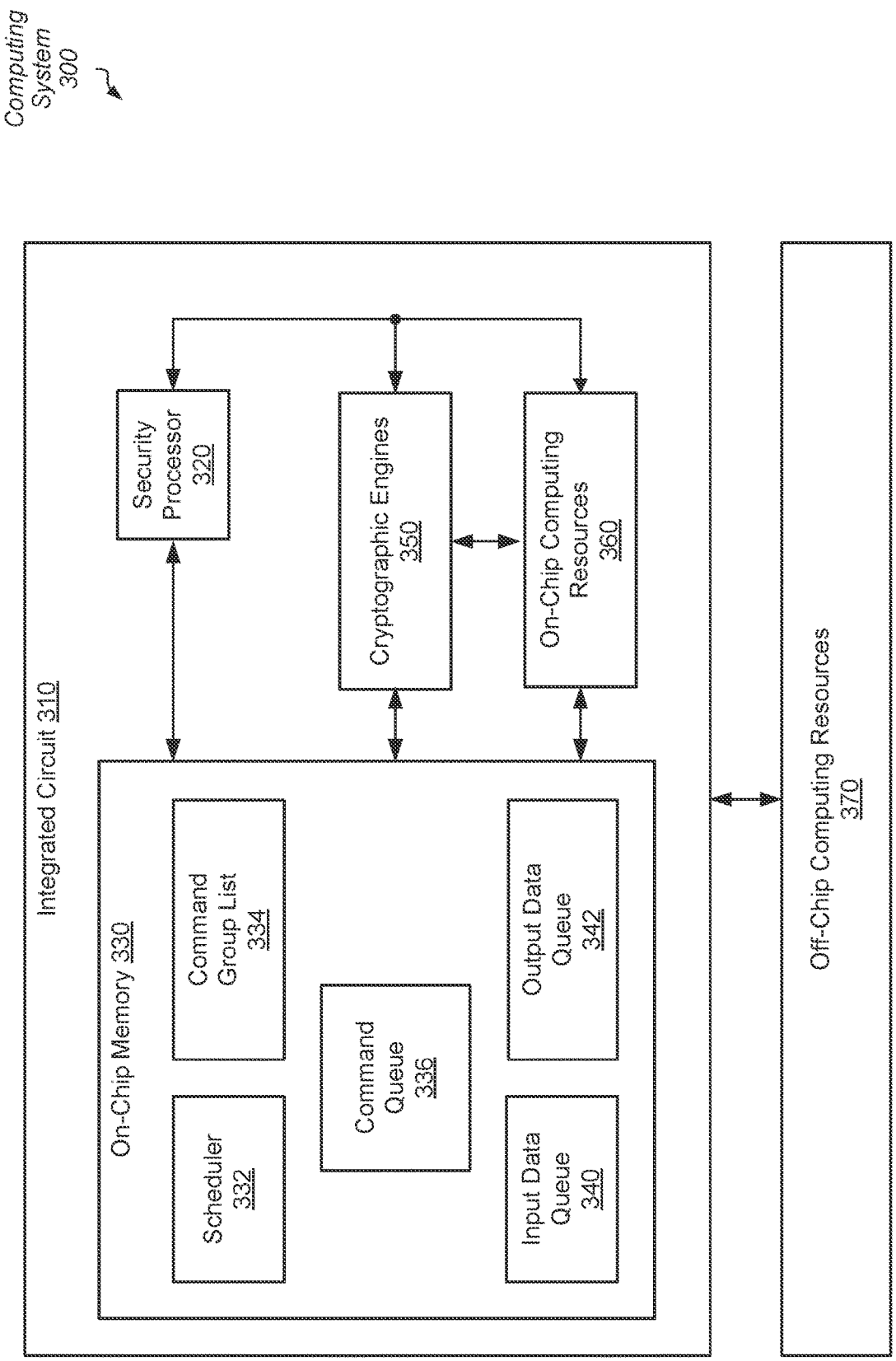
FIG. 3 is a generalized diagram of one implementation of a computing system.

Turning now to FIG. 3, a generalized block diagram is shown of a computing system 300. As shown, the computing system 300 includes an integrated circuit 310 and off-chip computing resources 370 that are located externally from the integrated circuit 310. The integrated circuit 310 includes on-chip memory 330, a security processor 320, crypto-graphic engines 350, and other on-chip computing resources 360. Examples of the integrated circuit 310 are a system on a chip (SoC), an accelerated processing unit (APU) that includes a central processing unit (CPU) and a graphics processing unit (GPU), one of a variety of types of an application specific integrated circuit (ASIC), a digital signal processor (DSP), or other. In some implementations, the functionality of the computing system 300 is incorporated on a system on chip (SoC). In other implementations, the functionality of the computing system 300 is incorporated on a peripheral card inserted in a motherboard. Although a single integrated circuit 310 is shown, the computing system 300 uses another number of integrated circuits in other implementations. The computing system 300 is used in any of a variety of computing devices such as a server used to provide critical applications and services, a desktop computer, a laptop, and so forth.

Each of the on-chip computing resources 360 and the off-chip computing resources 370 include a variety of components that provide particular functionality in the computing system 300. These components are not shown for ease of illustration. Examples of these components are a power manager, a communication fabric and/or system buses, a memory controller, a network interface unit, an input/output interface unit for communicating with external peripheral devices, one or more phased locked loops (PLLs) and other clock generation circuitry, temperature sensors and current sensors, and one or more other sensors for interfacing with a button, a touch screen, a keyboard, a pointing device, a camera, and so forth.

In various implementations, the off-chip computing resources 370 also include off-chip memory. Examples of the off-chip memory are a variety of types of dynamic random access memory (DRAM), disk memory such as hard disk drives (HDDs) or solid-state disks (SSDs), and remote memory located across a network. The remote memory can include DRAM or a disk drive (e.g., a HDD or a SSD) within a server used for Cloud-based storage. The off-chip computing resources 370 can also include one or more of a variety of types of read only memory (ROM) such as a boot flash chip and a secure digital (SD) card. The off-chip memory can include one or more of a file allocation table (FAT) and a master boot record (MBR) that stores code used for bootup operations.

Although a single on-chip memory is shown, in various implementations, the integrated circuit 310 includes multiple on-chip memories. An example of the on-chip memories in the integrated circuit 310 is one of a variety of static random access memories (SRAMs) used as different levels of a cache memory subsystem. In some implementations, the on-chip memory 330 is included within the security processor 320, rather than located externally as shown. Another example of the on-chip memories in the integrated circuit 310 is one of a variety of types of ROM such as flash memory.

In various implementations, the security processor 320, the on-chip memory 230, and protected security firmware form a security subsystem for the integrated circuit 310. The protected firmware is stored in one of the security processor 320 and the on-chip memory 230 and executed by the security processor 320. This security subsystem provides a software and hardware root-of-trust to help secure the processing and storage of trusted applications and corresponding sensitive data. The security subsystem manages the bootup operation, monitors activities of the integrated circuit 310 for suspicious actions, and performs security related operations such as performing encryption and cryptographic functions.

In some implementations, the security processor 320 is a dedicated processor, coprocessor or microcontroller used within the security subsystem, but not used for other functions. For example, the security processor 320 performs services independently from applications executed by a CPU, a GPU, a multimedia engine and other types of processing units in the integrated circuit 310. In other implementations, the security processor 320 is a coprocessor or microcontroller within a CPU, a GPU or other processing unit of the integrated circuit 310. In yet other implementations, the security processor 320 is one or more dedicated processor cores of the CPU, one or more dedicated compute units of the GPU, or other dedicated hardware within a processing unit of the integrated circuit 310. In an implementation, direct access of the security processor 320 is prevented, and communication with the security processor 320 includes using an inbox and an outbox messaging mechanism.

In some implementations, one or more of the security processor 320 and other circuitry within the integrated circuit 310 identifies the available cryptographic hardware resources in the cryptographic engines 350. In an implementation, the security processor 320 executes basic input output (BIOS) firmware, accesses a hardware configuration of the computing system 300, and tests one or more hardware components during a power-on self-test (POST). The hardware configuration of the computing system 300 includes at least a processor architecture, the input/output (I/O) ports for connected peripheral devices and storage devices, an amount of on-die memory and an amount of off-chip memory, power management features, and so forth. Alternatively, firmware using Unified Extensible Firmware Interface (UEFI) standard is used over BIOS. The security processor discovers the hardware available in the computing system 300 including the available cryptographic hardware resources in the cryptographic engines 350.

Examples of the available cryptographic hardware resources in the cryptographic engines 350 are an on-die SHA Engine with dedicated circuitry that executes a secure hash algorithm (SHA), an on-die AES Engine with dedicated circuitry that executes an advanced encryption standard (AES) algorithm, an on-die MAC Engine with dedicated circuitry that executes a message authentication code (MAC) algorithm, and so on. This dedicated hardware includes standalone processing units or engines as well as portions of other processing units. For example, one or more compute units, each with multiple parallel lanes of execution, of a GPU can be designated for use as one of the cryptographic engines 350.

When the security processor determines the available cryptographic hardware resources in the cryptographic engines 350, the security processor 320 generates the command group list 334. The command group list 334 identifies pairs of commands. Examples of these identified pairs of command types are a SHA command followed by an AES command, an AES command followed by a SHA command, a MAC command followed by an AES command, an AES command followed by a MAC command, and so on. In some implementations, the security processor 320 executes an operating system on a single processor core. This operating system, when executed by the security processor 320, generates the command group list 334 based on the available engines in the cryptographic engines 350. For example, in one implementation, when a first command has been identified as being ready for processing and it is determined the first command corresponds to a defined group of commands that can be issued and processed together, other commands that are ready for processing are scanned to determine if any can be combined with the first command in an issue group. If such a second (or third, fourth, etc.) command is found, then the second command is added to the issue group with the first command. In various embodiments as described herein, such commands may be combined in an issue group if there is a data dependency (e.g., a producer/consumer relationship) or they otherwise share common source data. In this manner, source data need be fetched only once (or fewer times than might otherwise be the case).

During the processing of security service requests, one or more of the security processor 320 and other circuitry within the integrated circuit 310 receives multiple commands with each including a cryptographic function. For example, the messaging mechanism with the inbox and outbox is used. The received commands are stored in the command queue 336. The security processor initializes the input data queue 340 and the output data queue 342 to be used while processing the commands. The corresponding source data payload (or source data, or input data) is stored in the input data queue 340. In some implementations, the security processor 320 does not fetch the source data from another memory into the input data queue 340 of the on-chip memory 330 until the security processor 320 is ready to execute the corresponding commands.

In an implementation, the security processor 320 executes a lightweight operating system as described earlier, and a scheduler 332 of this operating system uses the command group list 334 and the command queue 336 to generate scheduled commands to issue to the cryptographic engines 350. In some implementations, the scheduler 332 identifies one or more issue groups of commands among the commands stored in the command queue 336. In an implementation, the scheduler 332, when executed by the security processor 320, begins at a head of the command queue 336 and searches in an in-order manner. The scheduler 332 selects a command from the command queue 336, such as the head command or first command, and determines whether the command type of the selected command matches a first command type of the listed command pairs in the command group list 334. If so, then the scheduler 332 searches the other commands in the command queue 336 to determine if the command types of these other commands match a second command type of the listed command pairs in the group command list 334.

In one example, the command pair of a SHA command followed by an AES command (a SHA-AES pair) is in the command group list 334, because the security processor 320 determined that the cryptographic engines 350 includes dedicated hardware resources for a SHA engine and an AES engine. The scheduler 332, when executed by the security processor 320, determines the command type of the selected command is a SHA command type, and a command type of another command in the command queue 336 is an AES command. Therefore, the scheduler 332 determines that these two commands satisfy a first condition for being qualified as an issue group. If these two commands target the same source data, then these two commands satisfy another qualifying condition for forming an issue group.

If no intermediate in-order command between the two commands is scheduled to generate destination data that is included in either the source or destination data of the two commands (selected SHA command and the younger AES command), then the two commands satisfy yet another qualifying condition for forming an issue group. In such a case, the scheduler 332 generates an indication specifying the two commands are in an unchained issue group. In various implementations, the scheduler 332 issues the two commands in the unchained issue group to the cryptographic engines 350 in a manner as described earlier with respect to blocks 212 and 216 of method 200 (of FIG. 2). In some implementations, this unchained issue group includes more than two commands, since more than two commands satisfy the above conditions. In an implementation, the on-chip memory 330 stores a scheduled queue separate from the command queue 336, and the scheduler 332 inserts each of the indication of the unchained issue group and the two commands together in a separate scheduled command queue. Otherwise, the scheduler 332 issues the two or more commands in the unchained issue group directly from the command queue 336 to the cryptographic engines 350.

In another example, the scheduler 332 found two commands with the AES and MAC command types, but these two commands do not target the same source data. Rather, the scheduler 332 determines an output of the first AES command is an input of the younger MAC command. If no intermediate in-order command between these two commands is scheduled to generate destination data that is included in either the source or destination data of the two commands (selected AES command and the younger MAC command), then the two commands satisfy yet another condition. In such a case, the scheduler 332 generates an indication specifying the two commands are in a chained issue group. In some implementations, this chained issue group includes more than two commands, since more than two commands satisfy the above conditions. For example, a third even younger command uses the generated output data of the MAC command as input data. In various implementations, the scheduler 332 issues the two or more commands in the chained issue group directly from the command queue 336 to the cryptographic engines 350 in a manner as described earlier with respect to method 200 (of FIG. 2).

If commands do not qualify as being in a chained issue group or unchained issue group, then the scheduler 332 issues these commands as standalone commands from the command queue 336 to the cryptographic engines 350. In an implementation, the scheduler 332 issues a standalone command in a manner as described earlier with respect to method 200 (of FIG. 2). In some implementations, the scheduler 332 uses the head of the chained and unchained issue groups to determine an age of the issue groups. For an unchained issue group of commands, the scheduler 332 fetches only once the source data to be stored in the input data queue 340 if the source data is not already stored. For example, the data storage of the on-chip memory 330 is limited, and the source data is stored in another memory in the integrated circuit 310. The scheduler simultaneously sends a copy of the source data to multiple engines of the cryptographic engines 350, and simultaneously issues the commands of the chained issue group to the multiple engines.

For a chained issue group of commands, the scheduler 332 fetches the source data to be stored in the input data queue 340 if the source data is not already stored. The scheduler 332 sends a copy of the source data to a particular engine of the cryptographic engines 350 that corresponds to the command type of the head command of the chained group. In an implementation, the scheduler 332 issues the remaining commands of the chained issue group in a manner that allows a particular command to receive intermediate data generated by a most-recent previous command. Therefore, it is unnecessary to store the intermediate data in the on-chip memory 330. In some implementations, the engines of the cryptographic engines 350 divide the source data and the intermediate data in chunks and process data chunk by chunk. By identifying issue groups of commands and processing the commands as described based on types of issue groups, the integrated circuit 310 reduces both latency and data storage required for performing the received security service requests.

Figure 4:
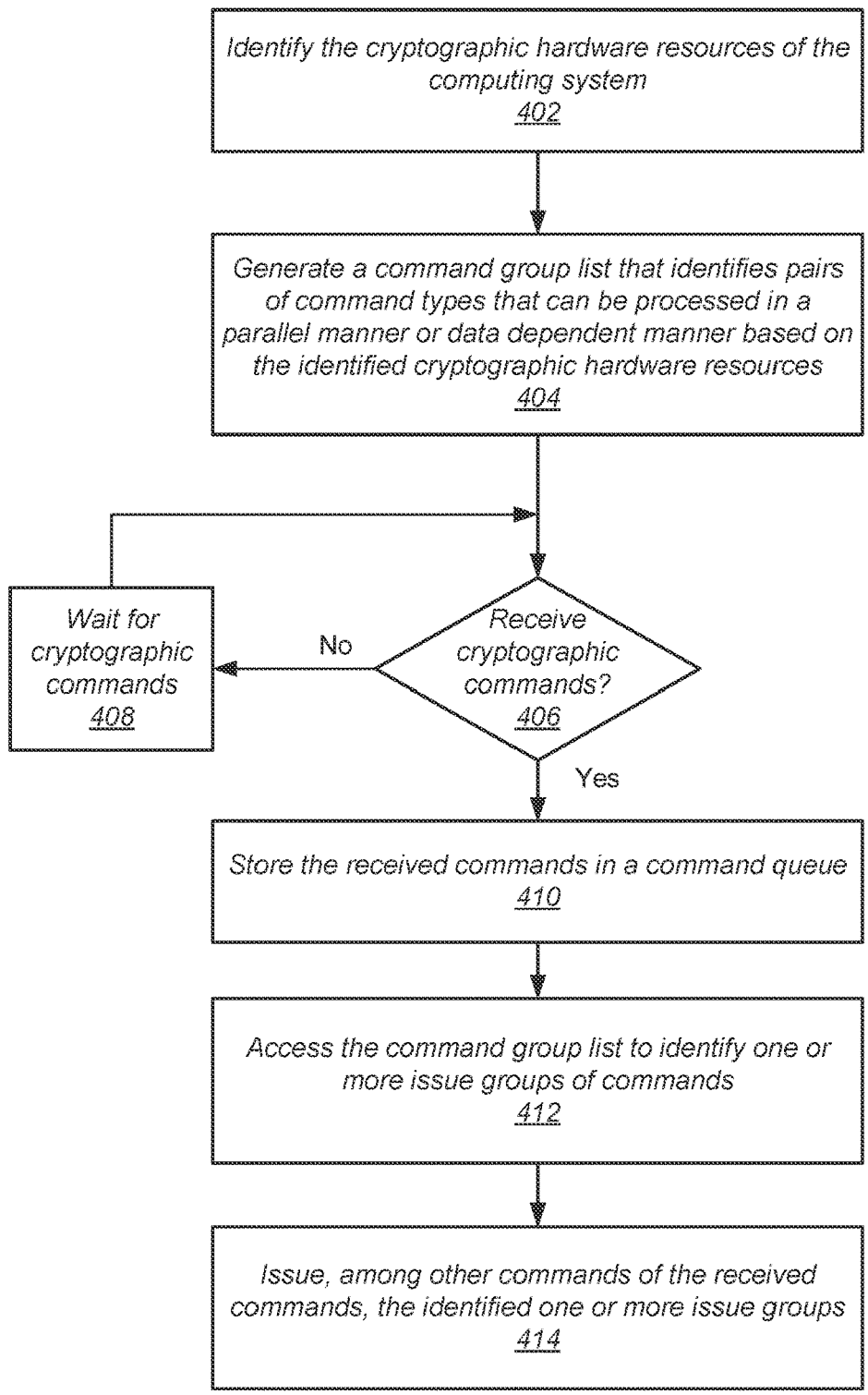
FIG. 4 is a generalized diagram of one implementation of a method for efficiently processing security service requests.

Referring to FIG. 4, a generalized block diagram is shown of a method 400 for efficiently processing security service requests. In an implementation, a dedicated security processor of a computing system identifies the cryptographic hardware resources of the computing system (block 402). In various implementations, the security processor executes a lightweight operating system that identifies the available cryptographic hardware resources of the computing system. For example, the security processor (or processor) identifies the available cryptographic hardware resources during a bootup operation. Examples of the identified available cryptographic hardware resources are an on-die SHA Engine with dedicated circuitry that executes a secure hash algorithm (SHA), an on-die AES Engine with dedicated circuitry that executes an advanced encryption standard (AES) algorithm, an on-die MAC Engine with dedicated circuitry that executes a message authentication code (MAC) algorithm, and so on.

The processor generates a command group list that identifies pairs of command types that can be processed in a parallel manner or data dependent manner based on the identified cryptographic hardware resources (block 404). Examples of the identified pairs of command types are a SHA command followed by an AES command, an AES command followed by a SHA command, a MAC command followed by an AES command, an AES command followed by a MAC command, and so on. If the processor does not receive one or more commands with each command having a cryptographic function ("no" branch of the conditional block 406), then the processor handles other tasks while waiting for these commands (block 408).

Otherwise, if the processor receives multiple commands with each command having a cryptographic function ("yes" branch of the conditional block 406), then the processor stores the received commands in a command queue (block 410). In various implementations, the command queue is located in secure on-chip memory. The processor accesses the command group list to identify one or more issue groups of commands (block 412). In various implementations, the steps performed in blocks 406 and 410 are directed toward an enqueueing process, and the steps performed in block 412 and upcoming block 414 are directed toward a de-queueing process. In some implementations, a separate thread is used for each of these processes. However, in other implementations, any number of queues, threads, and pipelining stages are used to perform these steps. The processor issues, among other commands of the received commands, the identified one or more issue groups of commands together with a respective indication of the group (block 414). In various implementations, the manner of issuing the commands follows the manner described earlier regarding method 200 (of FIG. 2). Although not yet described, the security processor is capable of verifying one or more other conditions are satisfied prior to grouping two or more of the received commands into a group. These additional steps are further described in the below discussion.

Figure 5:
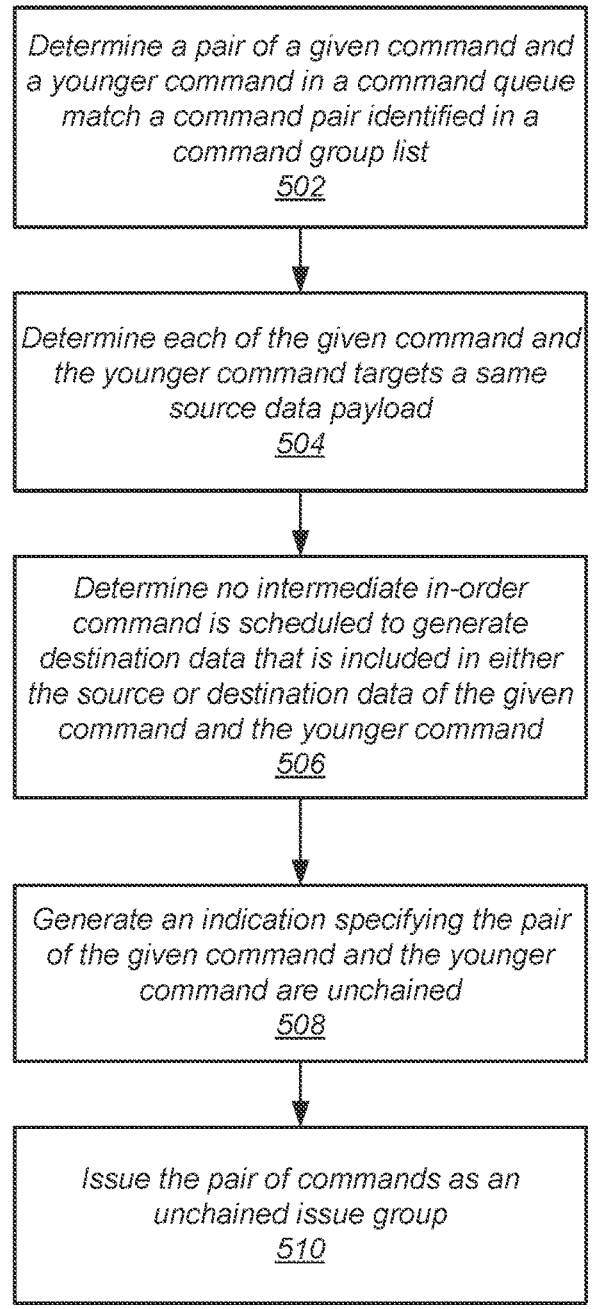
FIG. 5 is a generalized diagram of one implementation of a method for efficiently processing security service requests.

Turning now to FIG. 5, a generalized block diagram is shown of a method 500 for efficiently processing security service requests. In various implementations, an integrated circuit includes at least one or more processors with a dedicated security processor and on-chip memory that has a higher security level than off-chip memory. During the processing of security service requests, the security processor receives multiple commands with each including a cryptographic function. The security processor (or processor) determines a pair of a given command and a younger command in a command queue match a command pair identified in a command group list (block 502). Examples of the identified pairs of command types are a SHA command followed by an AES command, an AES command followed by a SHA command, a MAC command followed by an AES command, an AES command followed by a MAC command, and so on.

The processor determines each of the given command and the younger command targets a same source data payload (block 504). The processor determines no intermediate in-order command is scheduled to generate destination data that is included in either the source or destination data of the given command and the younger command (block 506). The processor generates an indication specifying the pair of the given command and the younger command are unchained (block 508). The processor issues the pair of commands together from the command queue to cryptographic engines as an unchained issue group (block 510). For example, the manner of issuing the commands follows the manner described earlier regarding method 200 (of FIG. 2).

Figure 6:
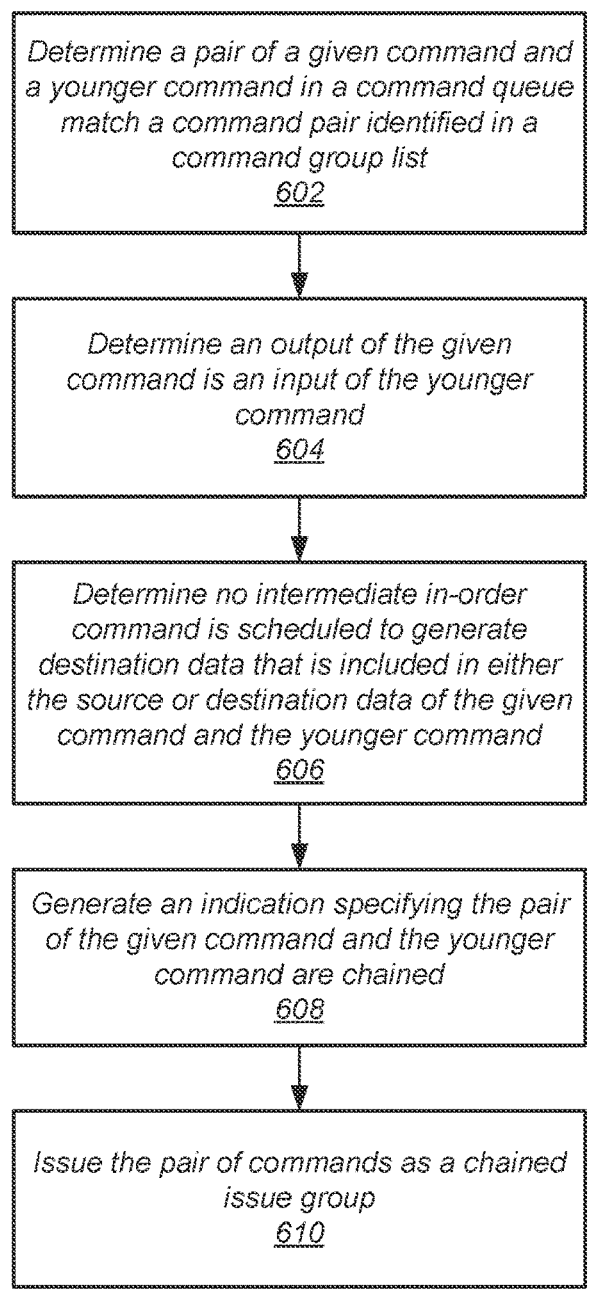
FIG. 6 is a generalized diagram of one implementation of a method for efficiently processing security service requests.

Referring to FIG. 6, a generalized block diagram is shown of a method 600 for efficiently processing security service requests. A processor, such as a security processor, of one or more processors of a computing system is designated as the processor to handle security service requests. The processor determines a pair of a given command and a younger command in a command queue match a command pair identified in a command group list (block 602). Examples of the identified pairs of command types were provided in the earlier descriptions of the security service operation (of FIG. 1), the block 404 of method 400 (of FIG. 4), and the block 502 of method 500 (of FIG. 5).

The processor determines an output of the given command is an input of the younger command (block 604). The processor determines no intermediate in-order command is scheduled to generate destination data that is included in either the source or destination data of the given command and the younger command (block 606). The processor generates an indication specifying the pair of the given command and the younger command are chained (block 608). The processor issues the pair of commands as a chained issue group to cryptographic engines (block 610). For example, the manner of issuing the commands follows the manner described earlier regarding method 200 (of FIG. 2).

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
circuitry configured to:
receive a plurality of commands, each comprising a cryptographic function;
generate an issue group comprising at least two commands of the plurality of commands that have a data dependency between them or target shared source data;
issue a first command of the issue group to execute a cryptographic function;
issue a second command of the plurality of commands to execute a cryptographic function, in response to the second command being in the issue group; and
issue a third command instead of the second command, in response to the second command not being in the issue group and the third command being a next in-order command after the first command.

2. The processor as recited in claim 1, wherein to form the issue group of commands, the circuitry is configured to:
responsive to the first command is ready for processing:
scan other commands, including the second command, that are ready for processing; and
add the second command to the issue group, in response to the second command has a data dependency with the first command.

3. The processor as recited in claim 1, wherein to form the issue group of commands, the circuitry is configured to:
responsive to the first command is ready for processing:
scan other commands, including the second command, that are ready for processing; and
add the second command to the issue group, in response to the second command shares same source data as the first command.

4. The processor as recited in claim 1, wherein the first command is an encryption command and the second command is a hash command.

5. The processor as recited in claim 1, wherein the circuitry is further configured to fetch source data for the issue group only once during processing of the issue group of commands.

6. The processor as recited in claim 1, wherein the second command is processed out of order with respect to other commands that are ready for processing.

7. A method comprising:
receiving, by circuitry of a processor, a plurality of commands, each comprising a cryptographic function;
generating, by the circuitry, an issue group comprising at least two commands of the plurality of commands that have a data dependency between them or target shared source data;
issuing, by the circuitry, a first command of the issue group to execute a cryptographic function;
issuing, by the circuitry, a second command of the plurality of commands to execute a cryptographic function, in response to the second command being in the issue group; and
issuing, by the circuitry, a third command instead of the second command, in response to the second command not being in the issue group and the third command being a next in-order command after the first command.

8. The method as recited in claim 7, further comprising generating, by the circuitry, a list of pairs of command types that identifies pairs of command types that can be processed in a parallel manner or a data dependent manner based on identified available cryptographic hardware resources.

9. The method as recited in claim 8, further comprising inserting, by the circuitry, a pair of commands of the plurality of commands in an unchained issue group, in response to:
the pair of commands have command types identified in the list;
each command of the pair of commands targets a same source data payload; and
no intermediate in-order command is scheduled to generate destination data that is included in either source data or destination data of the pair of commands.

10. The method as recited in claim 9, further comprising fetching, by the circuitry, the same source data payload once for the pair of commands.

11. The method as recited in claim 8, further comprising inserting, by the circuitry, a pair of commands of the plurality of commands in a chained issue group, in response to:
the pair of commands have command types identified in the list;
an output of a third command of the pair of commands is an input of a fourth command of the pair of commands; and
no intermediate in-order command is scheduled to generate destination data that is included in either source data or destination data of the pair of commands.

12. The method as recited in claim 11, further comprising:
fetching, by the circuitry, the source data once for the pair of commands; and
processing, by the circuitry, the third command using the source data to generate input data for the fourth command.

13. A computing system comprising:
on-chip memory comprising circuitry configured to store a plurality of commands, each comprising a cryptographic function;
a security processor comprising circuitry, wherein the circuitry is configured to:
retrieve the plurality of commands;
generate an issue group comprising at least two commands of the plurality of commands that have a data dependency between them or target shared source data;
issue a first command of the issue group to execute a cryptographic function;
issue a second command of the plurality of commands to execute a cryptographic function, in response to the second command being in the issue group; and
issue a third command instead of the second command, in response to the second command not being in the issue group and the third command being a next in-order command after the first command.

14. The computing system as recited in claim 13, wherein the circuitry is further configured to generate a list of pairs of command types that identifies pairs of command types based on identified available cryptographic hardware resources.

15. The computing system as recited in claim 14, wherein the circuitry is further configured to insert a pair of commands of the plurality of commands in an unchained issue group, in response to:
the pair of commands have command types identified in the list;
each command of the pair of commands targets a same source data payload; and
no intermediate in-order command is scheduled to generate destination data that is included in either the same source data payload or destination data of the pair of commands.

16. The computing system as recited in claim 14, wherein the circuitry is further configured to identify a pair of commands of the plurality of commands as an unchained pair, in response to:
the pair of commands have command types identified in the list;
each command of the pair of commands targets a same source data payload; and
no intermediate in-order command is scheduled to generate destination data that is included in either the same source data payload or destination data of the pair of commands.

17. The computing system as recited in claim 14, wherein the circuitry is further configured to insert a pair of commands of the plurality of commands in a chained issue group, in response to:
the pair of commands have command types identified in the list;
an output of a third command of the pair of commands is an input of a fourth command of the pair of commands; and
no intermediate in-order command is scheduled to generate destination data that is included in either a same source data payload or destination data of the pair of commands.

* * * * *